United States Patent [19]

Parulski et al.

[11] Patent Number: 5,633,678
[45] Date of Patent: May 27, 1997

[54] ELECTRONIC STILL CAMERA FOR CAPTURING AND CATEGORIZING IMAGES

[75] Inventors: Kenneth A. Parulski; Thomas A. Napoli, both of Rochester; David M. Lewis, Waterport, all of N.Y.

[73] Assignee: Eastman Kodak Company, Rochester, N.Y.

[21] Appl. No.: 574,756

[22] Filed: Dec. 20, 1995

[51] Int. Cl.$^6$ ............................................. H04N 5/30
[52] U.S. Cl. ..................... 348/232; 348/231; 348/239; 348/552
[58] Field of Search ................................ 348/231, 232, 348/239, 222, 552, 207; 358/335; H04N 5/30, 5/225

[56] References Cited

U.S. PATENT DOCUMENTS

| | | | |
|---|---|---|---|
| 4,524,381 | 6/1985 | Konishi | 358/29 |
| 4,574,319 | 3/1986 | Konishi | 358/335 |
| 5,016,107 | 5/1991 | Sasson et al. | 358/209 |
| 5,018,017 | 5/1991 | Sasaki et al. | 358/209 |
| 5,153,729 | 10/1992 | Saito | 358/209 |
| 5,335,072 | 8/1994 | Tanaka et al. | 348/232 |
| 5,477,264 | 12/1995 | Sarbadhikari et al. | 348/231 |
| 5,502,486 | 3/1996 | Ueda et al. | 348/239 |
| 5,515,101 | 5/1996 | Yoshida | 348/232 |

FOREIGN PATENT DOCUMENTS 0 640 938 A2  8/1994  European Pat. Off. ....... G06K 17/00

OTHER PUBLICATIONS

Kodak Professional Digital Camera System (DSC 100) User's Manual (excerpts). Eastman Kodak Company, 1991, 1992.

"TIFF/EP, A Flexible Image Format for Electronic Still Cameras", by Ken Parulski and George Lathrop, Eastman Kodak Company, Rochester, NY. Preprint from IS&T's 48th Annual Conference, May 1995.

Operation and Maintenance Manual for the Kodak Hawkeye II Imaging Accessory, Part No. 636–101, Catalogue No. 144 7903. Eastman Kodak Company, Federal Systems Division.

Primary Examiner—Glenton B. Burgess
Attorney, Agent, or Firm—David M. Woods

[57] ABSTRACT

An electronic camera captures images representing a variety of subjects and categorizes the image according to subject matter. The camera comprises an image sensor for capturing an image, a converter stage for converting the image into digital image data, and a memory for storing a plurality of categories providing classification of the images by subject. A processor in the camera has the capability of assigning the plurality of categories to the images captured by the camera, with each category providing a subject classification for the images. A user selects one or more categories for a plurality of images prior to capture, and an output image signal is then generated including the digital image data corresponding to a captured image and the particular category selected by the user. The categories can be default identifiers stored in the memory, or can be names, text (i.e., account number), and/or graphics overlays (i.e., company logo) entered via a host computer and uploaded to the camera memory before the pictures are taken.

30 Claims, 6 Drawing Sheets

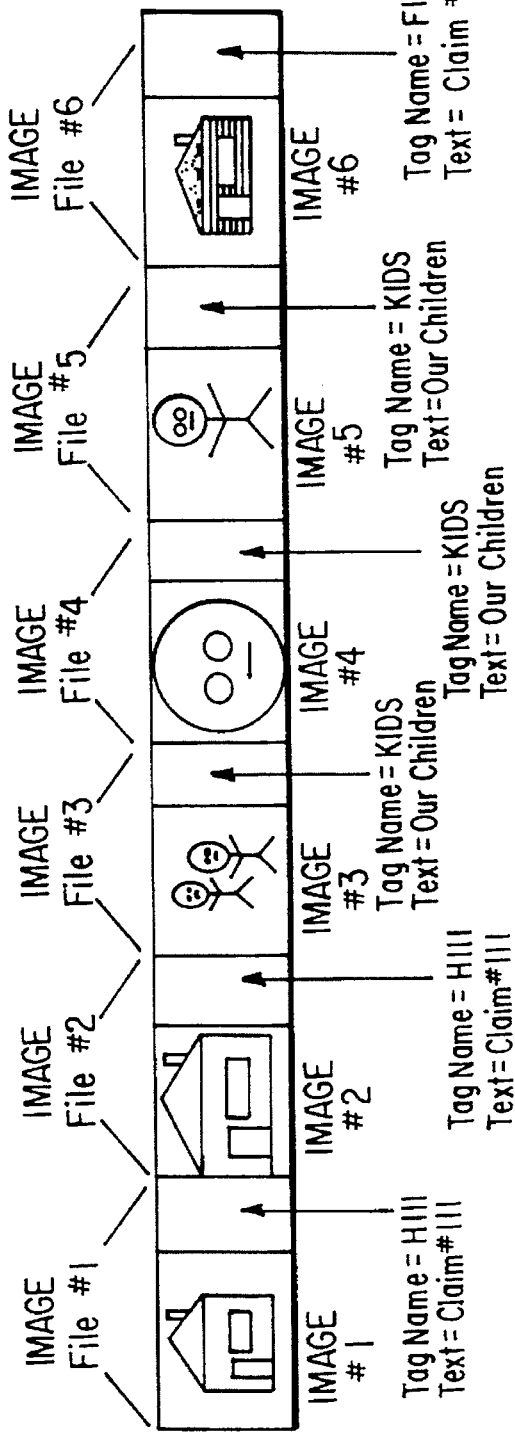

ELECTRONIC STILL CAMERA FOR CAPTURING AND CATEGORIZING IMAGES

FIELD OF THE INVENTION

This invention pertains to the field of electronic imaging systems, and in particular to a digital electronic still camera of the type that is used with a host computer.

BACKGROUND OF THE INVENTION

As understood in the prior art, a digital electronic still camera is a device which uses an electronic sensor to capture an image; signal processing to represent the captured signal numerically; and some storage device to preserve the numerical image data. It is further known for a digital electronic still camera to use a removable storage device, such as an integrated circuit memory card, to store images. For instance, U.S. Pat. No. 5,016,107 describes an electronic still camera utilizing image compression and providing digital storage in a removable memory card having a static random access memory. In this camera, the integrated circuits in the removable memory card store image data and a directory locating the data.

Coordination between a digital camera and a computer is generally known in the prior art. FIG. 1 shows a known electronic still photography system useful for inputting images to a computer. The system includes an electronic camera 1 with an electronic sensing section 1a, a digital processing section 1b, a memory card slot 2, and a removable memory card 3; and a host computer 4 with a built-in memory card reader 5, a printer 6a, a display 6b, a keyboard data entry device 7 and a disk drive 8. Images are captured by the sensing section 1a in the camera 1, manipulated in the processing section 1b, stored on the memory card 3, and transferred from the card 3 to the host computer 4. The software used to control the sensing and processing sections 1a and 1b in the camera is located in firmware memory 1c in the camera 1. The application software used to control the playback operations of the host computer is supplied, at least in part, by the camera manufacturer. For instance, the manufacturer may provide a special disk or memory card that comes with the camera. The application software is transferred to the computer hard drive 8, and then downloaded to a computer random access memory (RAM) memory 9a, where the program is used by a central processing unit (CPU) 9b.

Digital cameras, such as the Kodak Digital Science DC40™ camera sold by Eastman Kodak Company, allow almost a hundred images to be stored. Because the images are stored as sequentially numbered images, it can be difficult and time consuming to locate a group of images of interest from all of the images stored in the camera. In a typical usage, an insurance adjuster may take a number of photos in processing a number of different claims during one day's operations. It would be desirable to be able to identify the images of each group, for example by claim number or client name. It may be further desirable to allow this information, along with the date and time or a company logo, to be optionally included with the image data. This ensures that any prints made from the camera can be easily identified. Such processing of the captured images is today performed in a host computer, such as the host computer 4 in FIG. 1.

The Kodak Professional Digital Camera System (model DCS-100) included a digital camera tethered by cable to a separate digital storage unit (DSU). The DSU, similar to the computer 4 of FIG. 1, contained a hard drive for storing images, a small image display, and a keypad for manipulating the images. For images that had already been captured by the camera, the system included a "tag" feature that allowed a user to flag selected images for later display or for uploading from the DSU to another computer. Suppose that a user wanted to tag a couple of already-captured images for later viewing or uploading. The first of the images would be brought up on the display and a "tag" button on the keypad would be pressed, and so on with the other images that are to be tagged. Then if the user presses a "find tags" key on the keypad, the first of the tagged images is displayed (and/or uploaded). With a second press of the "find tags" key, the second tagged image is displayed (and/or uploaded), and so on.

Another embodiment of this camera, the Kodak Hawkeye II camera, also allowed the user to type in a name for any one image after the image was taken, and to add a "note" text-string to the image file. Both cameras allowed a simple division of already-captured images into "tagged" and "not-tagged" images and required a pattern of keystrokes subsequent to capture for every image of interest. In particular, the tagging feature functioned more as a post-capture data gatekeeper than as a useful tool for image handling. Anything more complex in the way of data organization requires, as shown in FIG. 1, the use of a special application program in the host computer 4 to organize and sort the image data. Consequently, it would be desirable to have an electronic still system that could handle image content more efficiently in the field than is presently the case.

SUMMARY OF THE INVENTION

The present invention is directed to overcoming one or more of the problems set forth above. Briefly summarized, according to one aspect of the present invention, an electronic camera captures images representing a variety of subjects and categorizes the image according to subject matter. The camera comprises an image sensor for the images, a converter stage for converting the images into digital image data, and a memory for storing a plurality of categories providing classification of the images by subject. A processor in the camera has the capability of assigning the plurality of categories to the images captured by the camera, with each category providing subject classification of one or more images. A user then interacts with a user control on the camera in order to select one or more of the categories for the images, and an output image signal is then generated including the digital image data corresponding to the images and the one or more categories selected by the user control.

The advantage of the invention is that the known provision of a simple post-capture "tag" is enlarged into useful pre-capture categories that can effectively manage images according to variable subject content. According to this invention, a digital camera includes a display-based "tag" icon/feature which the user can set to an appropriate category before taking a group of pictures. The category names can be defaults, or can be names and optional text (i.e., account number) and/or graphics overlays (i.e., company logo) entered via a host computer and uploaded to the camera before the pictures are taken. When the user selects a particular category, the category name is stored along with the image data in the image file, and any text and graphics logo, as appropriate, are overlaid onto the image. When downloading the images to a host computer, the user can select a category and download only the images which have a particular category name, or the images can be stored in folders labeled with each category name.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 6 is an example of categories that are customized from a host computer.

FIG. 7 is an example of a file format resulting from customized categories.

DETAILED DESCRIPTION OF THE INVENTION

Because electronic still cameras employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described are provided in software. Given the system description as described in the following materials, all such software implementation is conventional and within the ordinary skill in such arts.

Figure 2:
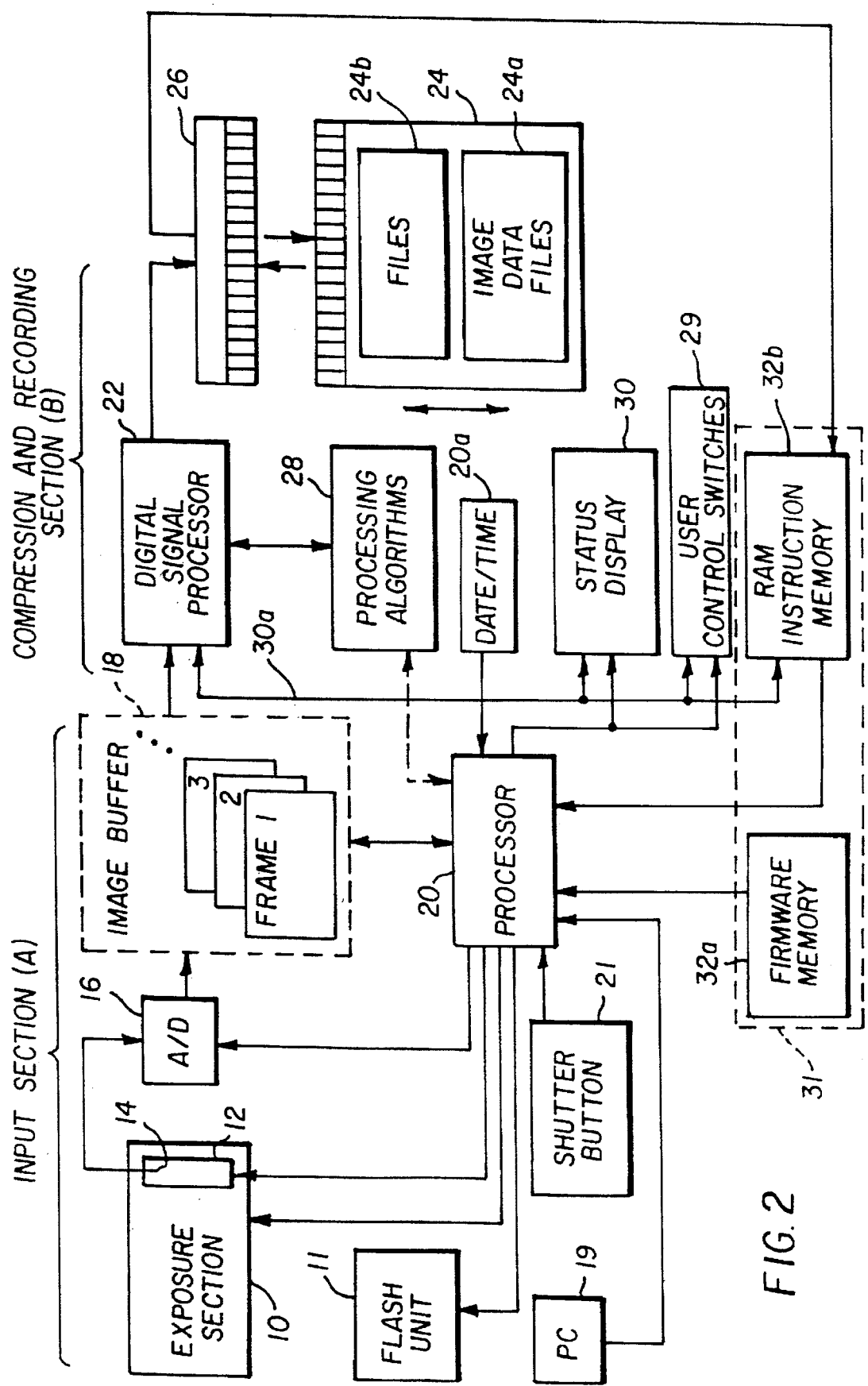
FIG. 2 is a block diagram of an electronic camera configured according to the invention to process and categorize images.

FIG. 2 shows an electronic still camera capable of categorizing images as taught by the invention. The electronic still camera is divided generally into an input section A and a compression and recording section B. The input section A includes an exposure section 10 for directing image light from a subject (not shown) toward an image sensor 12. A flash unit 11 may be used to illuminate the subject. Although not shown, the exposure section 10 includes conventional optics for directing the image light through a diaphragm, which regulates the optical aperture, and a shutter, which regulates exposure time. The sensor 12, which includes a two-dimensional array of photosites corresponding to picture elements of the image, is a conventional charge-coupled device (CCD) using, e.g., either well-known interline transfer or frame transfer techniques. The sensor 12 is exposed to image light to capture a particular image; accordingly, analog image charge information corresponding to the particular image is generated in respective photosites. The charge information is applied to an output diode 14, which converts the charge information to analog image signals corresponding to respective picture elements of the particular image captured.

The analog image signals are applied to an A/D converter 16, which generates digital image data from the analog input signals for each picture element. The digital image data is applied to an image buffer 18 for storing one or more images, albeit shown in FIG. 2 as a random access memory (RAM) with storage capacity for a plurality of still images. A programmed control processor 20 generally controls the input section A of the camera by initiating and controlling exposure (by operation of the diaphragm and shutter (not shown) in the exposure section 10), by controlling the flash unit 11, by generating the horizontal and vertical clocks needed for driving the sensor 12 and for clocking image information therefrom, and by enabling the A/D converter 16 in conjunction with the image buffer 18 for each signal segment relating to a picture element. Exposure control would typically be effected by using ambient light information from a photocell 19, and a shutter button 21 allows the user to initiate a capture cycle. The processor 20 also receives date and time information from a date/time generator 20a.

Once a certain amount of digital image data has accumulated in the image buffer 18, the stored data is applied to a programmed digital signal processor 22, which controls the throughput processing rate for the compression and recording section B of the camera. The algorithms and other operating code used by the processor 22 are stored in an algorithm memory 28. The digital signal processor 22 compresses each still image stored in the image buffer 18 according to any one of a number of known image compression algorithms, such as the well-known JPEG (Joint Photographic Experts Group) discrete cosine transformation-based compression algorithm. The processor 22 applies the compression algorithm from the memory 28 to the digital image data, and sends the compressed data to a removable storage device via a signal port 26. However, while compression is shown in the camera of FIG. 2, compression is not a necessary feature, and uncompressed data could be stored instead in the removable storage device.

In this example, the signal port 26 is a card interface and the removable storage device is a memory card 24. While a memory card 24 is shown in this system as the storage device, other devices may be used, such as a floppy disk magnetic medium, a small hard drive, or optical storage (in the latter cases, suitable conventional reading/writing apparatus would be provided in the camera, e.g., magnetic or optical read/write head, etc.). A representative memory card is a card adapted to the PCMCIA card interface standard, such as described in the *PC Card Standard, Release* 2.0, published by The Personal Computer Memory Card International Association, Sunnyvale, Calif., September 1991. The memory card 24 accordingly contains solid state memory 24a, such as Flash EPROM memory, which the card uses to store image data files.

According to this invention, the digital camera includes a categorization feature which enables a user to establish an appropriate category, providing classification of the images by subject, before taking a group of pictures. The category information can be default code symbols (A,B,C, etc.), or can be externally-generated category information, such as names and optional text (i.e., account numbers) and/or graphics overlays (i.e., company logos), which is entered via a host computer and uploaded to the camera through the signal port 26 before the pictures are taken or via cable connection. After the user selects a particular category, the image is captured and the category information is stored in the removable storage device along with the image data in the image file, and any text and graphics logo, as appropriate, are overlaid onto the image. When downloading the images to a host computer, the user can select a particular category and download only the images which have a particular category identifier, or the images can all be downloaded and stored in file folders labeled with each category name.

Consequently, the memory card 24 contains additional memory to store header files 24b containing category information helpful in providing classification of the images by subject matter. Such category information may include default tag codes, such as simple alphabetic identifiers A, B, C, D, etc., or alphanumeric names that can be associated with specific images according to subject matter. The header files 24b can also contain strings of text that identify particular images and separate graphics images that signify or otherwise identify subject matter. The header files 24b can also contain instructions to overlay all or part of the category information into the image data files 24a, or, alternatively, the digital signal processor 22 can access an algorithm in the algorithm memory 28 which accomplishes the overlay, and then stores all or part of the category information with the image data. It is a further feature of this invention that the externally generated category information can be supplied to the digital camera through the signal port 26. Such externally generated category information can be stored in the Card Information Structure (CIS) of the PCMCIA Format (as described in the aforementioned *Release* 2.0), in the header data file 24b, or in a portion of the memory space of the memory 24a used to store the image data.

The camera also contains a memory section 31, including firmware memory 32a with operating code for the camera, as well as RAM instruction memory 32b connected to receive code from the memory card 24. When the memory card 24 is inserted into the camera, the processor 20 uses the firmware algorithms in the memory 32a to determine if the memory card 24 contains externally generated files which can be used by the camera. If not, the firmware algorithms supplied with the camera in the memory 32a are used by the programmable processor 20. In particular, the default category parameters are stored in the firmware memory 32a and accessed by the processor 20. If the card does contain appropriate externally generated category information, however, these are downloaded from the header file section 24b of the card 24 to the RAM instruction memory 32b and used by the programmable processor 20 in place of some portion of the firmware algorithms supplied with the camera from the firmware memory 32a. In this way the camera can execute customized category definitions which provide higher quality or more complex categorization of pictures.

Figure 3:
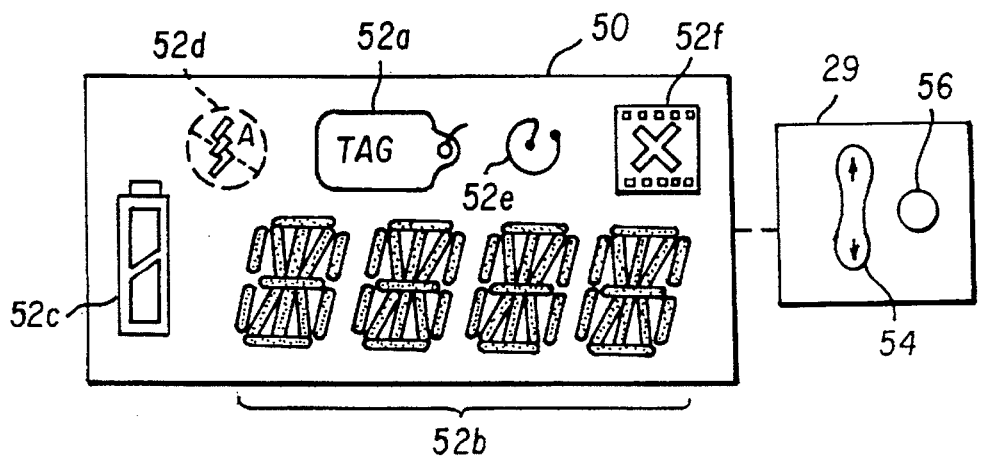
FIG. 3 is a diagram of the status display panel and the user control switches used in the camera shown in FIG. 2.

User control is provided by a status display 30 connected to the control processor 20 for displaying information useful in operation of the camera, and by a set of user control switches 29. The set of user control switches 29 are also connected to the processor 20 for entering, highlighting, and selecting information displayed on the status display 30. In accordance with invention, the status display 30 is a liquid crystal display (LCD) having a panel configuration 50 such as shown in FIG. 3, which includes a "tag" icon 52a, and an alphanumeric segmented section 52b. (The panel configuration includes other typical icons, such as a battery level icon 52c, a flash mode icon 52d, a self-timer icon 52e, and an image delete icon 52f.) The user control switches 29 include a toggle switch 54 and a select button 56. The toggle switch 54 is used to toggle to a setting once an icon has been activated by the select button 56. For example, if the flash mode icon 52d is highlighted and showing that it is the currently active control, pressing the select button would activate the tag icon 52a and make it the currently active control.

While not important to this invention, other information displayed on the status display 30 might include typical photographic data, such as shutter speed, aperture, exposure bias, color balance (auto, tungsten, fluorescent, daylight), high/low resolution, low light, exposure modes (aperture preferred, shutter preferred), and so on. Moreover, other information unique to this type of camera may be displayed. For instance, the memory card 24 would ordinarily include a directory signifying the beginning and ending of each stored image. This would show on the display 30 as either (or both) the number of images stored or the number of image spaces remaining, or estimated to be remaining.

Figure 9:
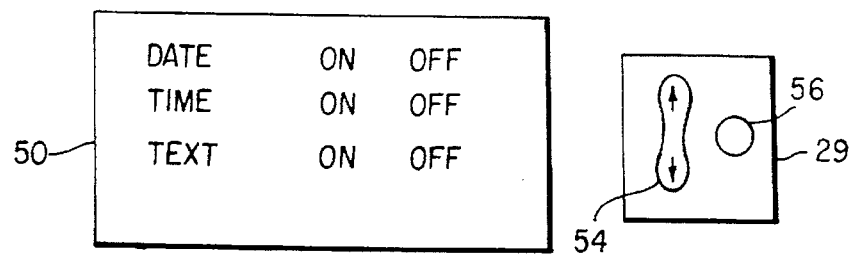
FIG. 9 is an additional diagram of the status display panel and the user control switches set up for activating an overlay feature.

If externally generated category information is present in the header file 24b on the card 24, it can also be identified on the status display 30. For instance, the externally generated category information, such as names, text strings, and graphics images can be identified and displayed if the status display 30 has the appropriate display capability. Alternatively, the toggle switch 54 can be used to cycle through alphanumeric names that are provided from the host computer and displayed on the segmented section 52b. Selecting any one name then automatically accesses any text string or graphics image that might be associated with the name in the instruction memory 32b, and stores such strings or graphics image with the digital image data. The camera may also have the additional feature of overlaying a text string, or date and/or time from the date/time generator 20a, into the image. Whether or not the date/time or text string is overlaid in the images of any particular category can be controlled by overlay control information for each category present in the header file 24b. Alternately, this can be done from additional icons in the panel configuration 50 and from the user control switches 29, as shown in FIG. 9. Date, time, name, and text are separately activated by the toggle switch 54, and "on" (overlay active) or "off" icons are activated by the select switch 56. It is assumed that an uploaded graphics image would always overlay into the image, but if this is not always desirable, then a separate graphics icon may be provided for overlay control.

Figure 4:
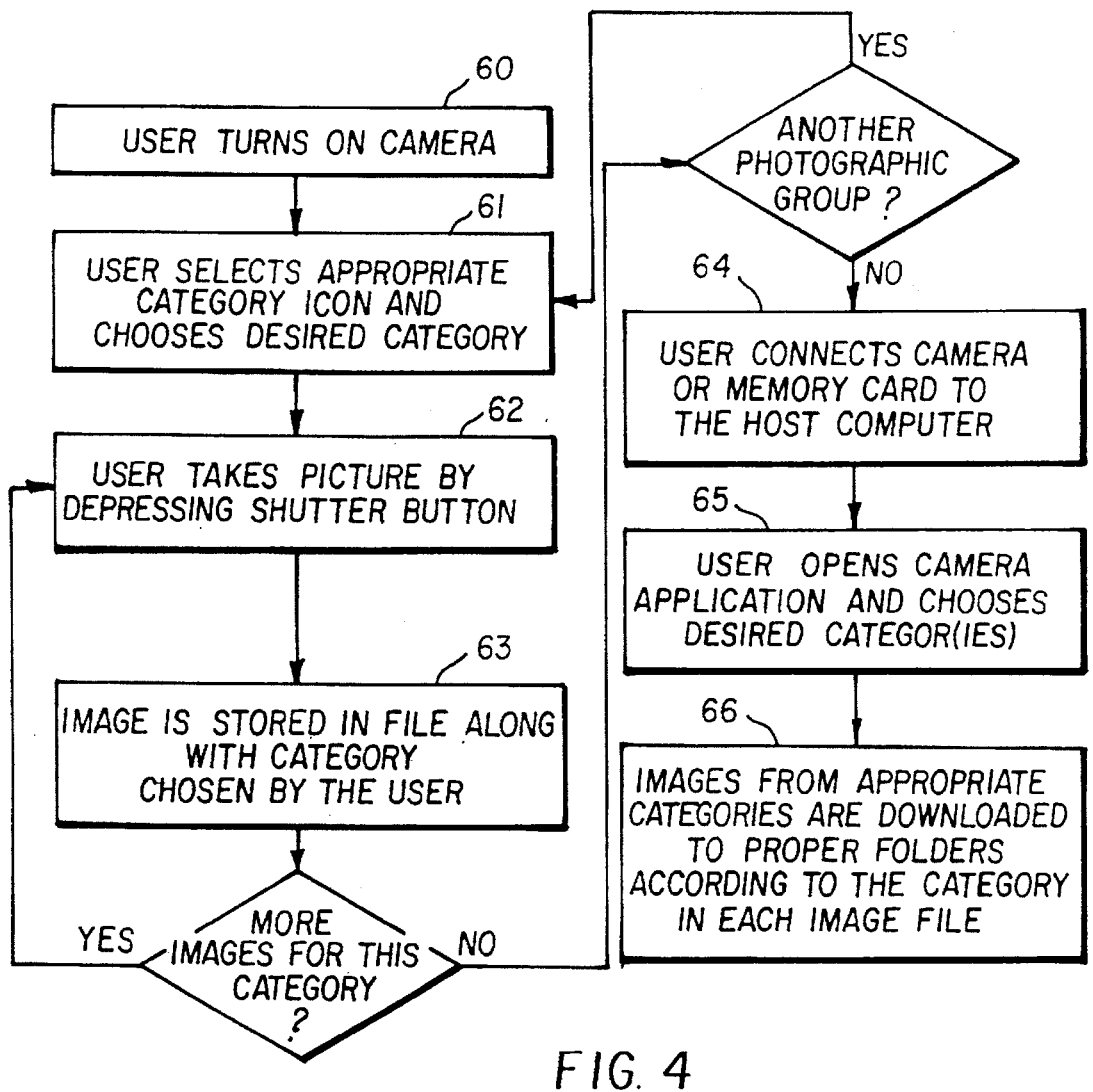
FIG. 4 is a process diagram for categorizing images according to default parameters stored in the camera shown in FIG. 2.
Figure 5:
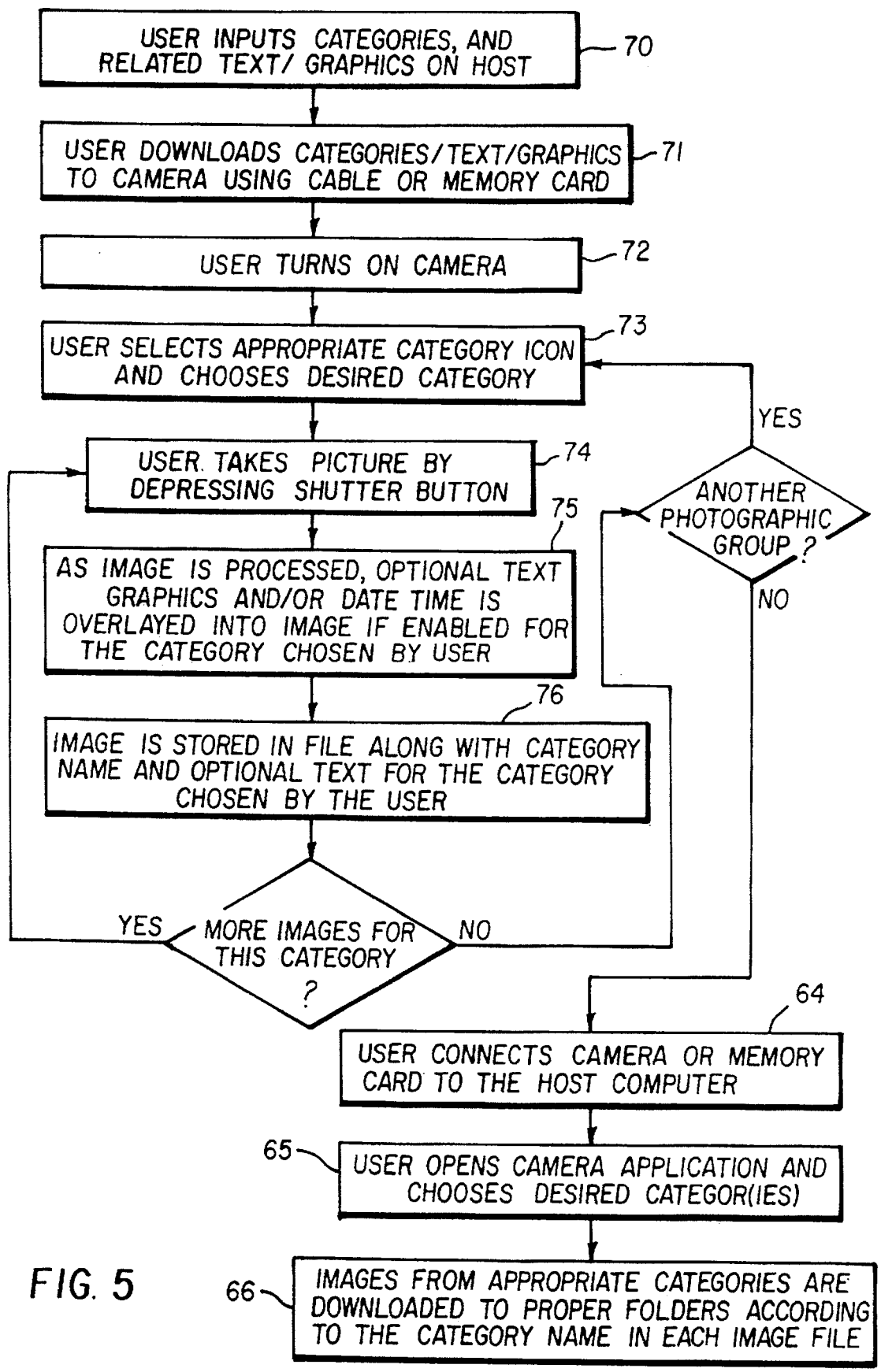
FIG. 5 is a process diagram for categorizing images according to externally generated parameters supplied to the camera shown in FIG. 2.

The process for categorizing images according to default parameters is shown in FIG. 4, and the process for categorizing images according to customized, externally generated parameters is shown in FIG. 5. Referring first to FIG. 4, when the camera is first turned on, the "tag" icon 52a will be shown only in outline form (step 60). The inner part of the "tag" icon 52a will fill to indicate when the user has positively selected the tag feature by activation of the user control switches 29. In the default mode, there are a predetermined plurality of possible categories, for example, five alphabetic categories A,B,C,D,E and NONE (or OFF). With the tag icon 52a activated, the user will select categories A,B,C,D,E,NONE (repeat sequence A,B, etc.) by pressing the toggle switch 54 (step 61). Each press of the switch 54 causes a different tag code to be displayed on the alphanumeric segment 52b.

After the tag is selected, the user can activate other icons by use of the select button 56. Then, when the shutter button 21 is pressed, the selected category (tag) is associated with the digital image data (steps 62, 63). Then the steps 62, 63 are repeated for any additional images in the same category. If a new category is desired, the process reverts to step 61. When all the images are captured, the user connects the camera (by cable) or the memory card 24 to a host computer (step 64), such as the host computer 4 illustrated in FIG. 1. Using software supplied by the camera manufacturer, the user opens a camera application and chooses the desired category (step 65). Then the images from appropriate categories stored in the camera, or the memory card 24, are downloaded to proper file folders according to the category data stored with the digital image data in each file (step 66).

The user may also customize the tags using the host computer. As shown in the process diagram of FIG. 5, a user inputs category information, such as category names, and related text or graphics images, from the host computer (step 70). The user then downloads the category information to the camera (step 71). This may be done through a tethered connection to the camera, or by writing appropriate files into the memory card 24. The user turns on the camera (step 72), and selects an appropriate category (step 73). At this stage, the user can also decide to activate the overlay capability for date, time, text, and graphics images. The picture is taken (step 74), and the category information is optionally overlaid into the image (step 75). The digital image data is then stored in the memory card 24 together with category information, either separately or as overlaid into the image data (step 76). The remaining steps are substantially the same as in FIG. 4.

Figure 8:
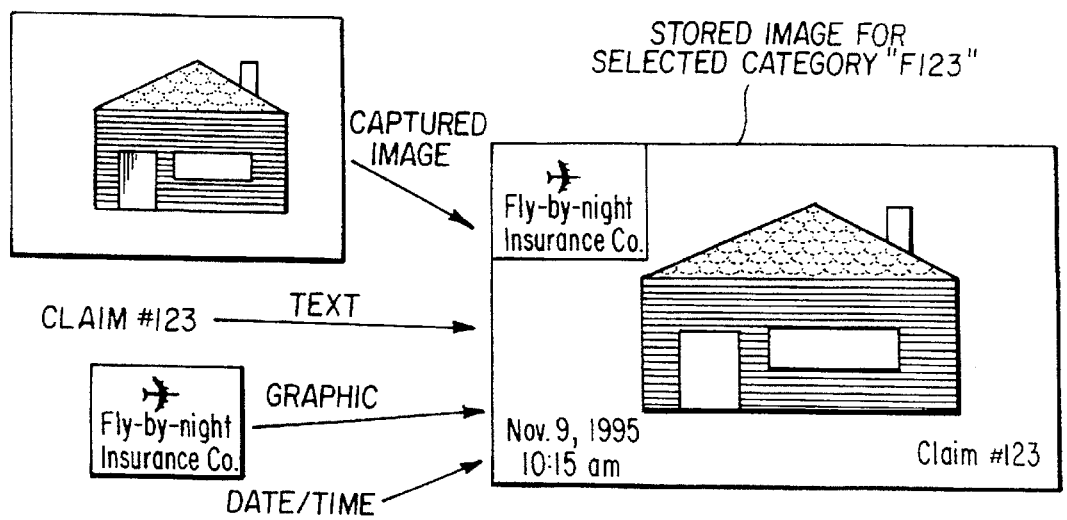
FIG. 8 is an example of an image display with customized category information overlaid into the image.

FIGS. 6, 7, and 8 show examples of categories customized from a host computer, following on the previously mentioned claims adjuster example, and the resulting file format and image display. As shown in FIG. 6, the categories (tags) are given names, optional text strings, and graphics. The category information also includes overlay control information indicating whether or not the text string, date, and time should be overlaid into the image. In this example, the user, a free-lance claims adjuster, has created four different categories (H111 and H122) for different insurance claims from a first insurance company, one (F123) for a claim from a second insurance company, and one (KIDS) for personal images. The user also indicates whether the text string should be overlaid into the image, and whether the camera should overlay the date and/or time in the image. This category information, including names, text, and graphics, is then downloaded to the host computer from the memory card 24. A typical technique for such downloading is described in U.S. Ser. No. 08/219,608, entitled "Electronic Imaging System Using a Removable Software-Enhanced Storage Device", which is to issue as U.S. Pat. No. 5,477,264 on Dec. 19, 1995.

Figure 10:
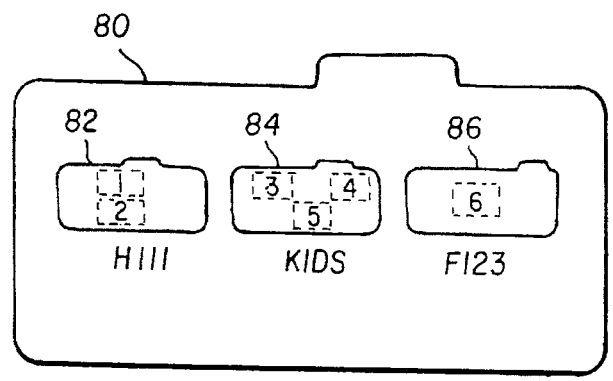
FIG. 10 is an example of an image file management structure using categories.

When programmed by the host or memory card 24, the number of tag categories that can be selected in the camera, and the four-letter name of each category, is as set by the user via the host computer. The user selects the appropriate category before taking a sequence of images. The tag names and text are then included in the image files, as shown in FIG. 7. In this example, the user selected Tag name H111 and took images #1–2. The user then selected Tag name KIDS and took images 3–5. Finally, the user selected tag name F123 and took image #6. As the images are captured and processed, the appropriate overlay information for the tag chosen is used. For the category "F123", the tag indicates that the image should include a graphics overlay, the text "Claim #123", and the date/time, as shown in FIG. 8. In a further embodiment shown in FIG. 10, images are stored on the removable memory card 3 within a file 80 containing a group of files corresponding to each category. For example, file 82 contains images #1 and #2 having tag name "H111", file 84 contains images #3, #4 and #5 having tag name "KIDS", and file 86 contains image #6 having tag name "F123".

Figure 1:
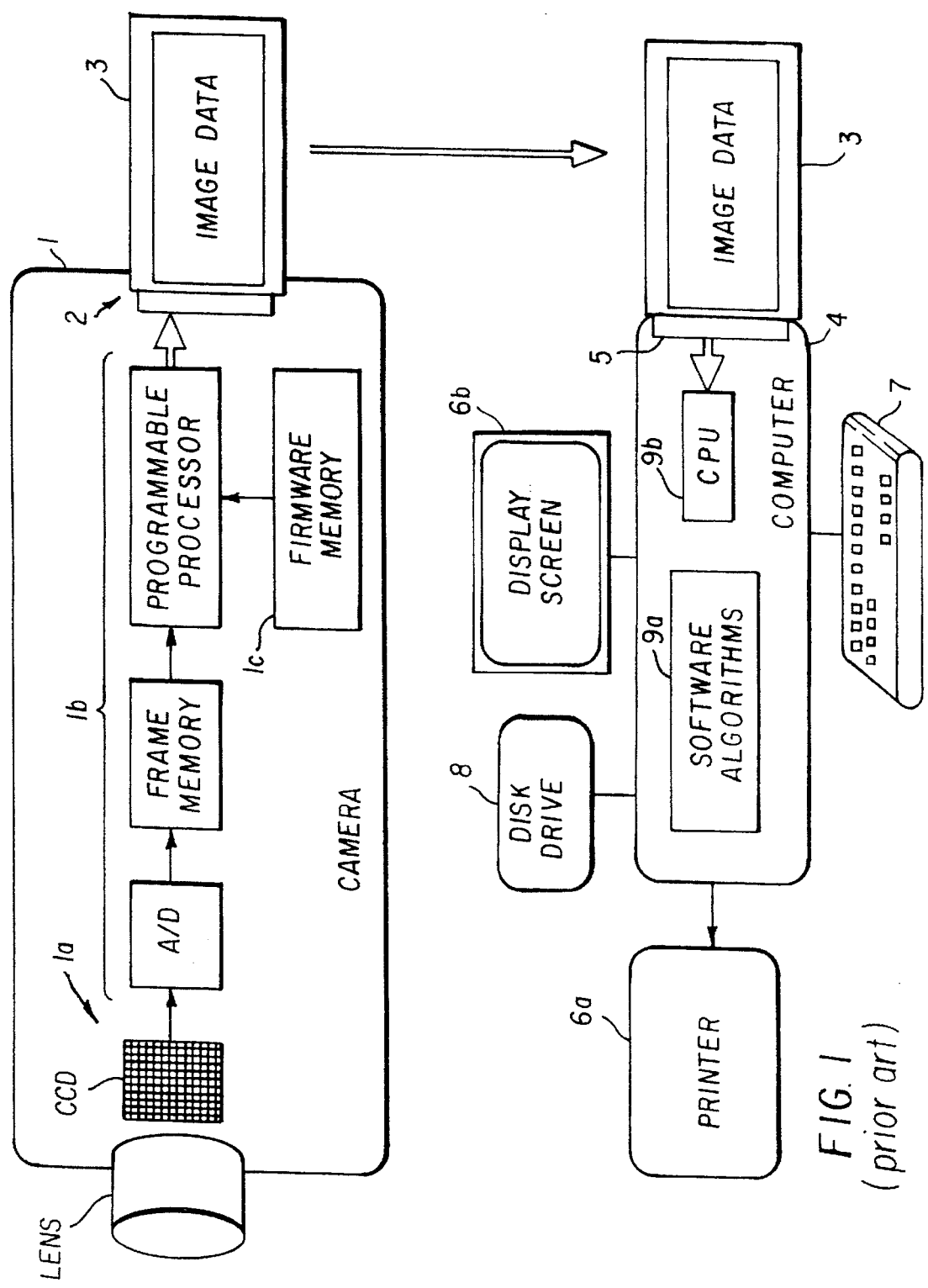
FIG. 1 is a diagram of a known electronic imaging system incorporating a digital camera for inputting images to a host computer.

After the images from the camera are stored on the memory card 24, the card is inserted into the computer memory card reader 5 (see FIG. 1). In applications where the memory card may contain category information which can be used by the computer, the computer uses the software supplied with the camera to check if the memory card contains such information. If the card does contain appropriate category information, this information is downloaded from the card to the RAM instruction memory 9a and used by the CPU 9b in combination with the software algorithms from the hard drive 8. This allows a quick and convenient way of categorizing the images accessed by the computer, without requiring further intervention from the host computer.

According to the invention shown in FIG. 2, the images are transferred from the camera to the computer via the removable memory, rather than a cable interface. Therefore, the camera does not have to be in the same location as the computer. This makes it possible to view the images from the camera in many different locations, on many different computers, as long as the computer has the ability to both accept the removable memory and correctly process the image data. Since the removable memory can be used to store code for processing the image data in the computer, this code can include the processing algorithms needed to download the stored images according to the stored categories. The advantage of storing the processing algorithms on the removable memory is that it eliminates the need for a separate means of supplying the code, such as the floppy disk. Supplying the algorithms along with the images on the removable memory, such as a PCMCIA card, makes it possible for any computer capable of reading the image data from the card to also download and utilize the algorithms needed to process the image data in order to create one or more files of categorized images.

The invention has been described with reference to a preferred embodiment. However, it will be appreciated that variations and modifications can be effected by a person of ordinary skill in the art without departing from the scope of the invention. For example, the image files shown in FIG. 7 could be stored in many different types of optical, magnetic, or solid-state digital memory. The category customization information shown in FIG. 6 could be transferred from the computer 3 to the camera 1 via a cable connection instead of via a removable memory card, or the camera 1 could include means for entering category customization information.

PARTS LIST

1 ELECTRONIC CAMERA
1A ELECTRONIC SENSING SECTION
1B DIGITAL PROCESSING SECTION
1C FIRMWARE MEMORY
2 MEMORY CARD SLOT
3 REMOVABLE MEMORY CARD
4 COMPUTER
5 MEMORY CARD READER
6a PRINTER
6b DISPLAY
7 KEYBOARD
8 HARD DRIVE
9A COMPUTER RAM MEMORY
9B CPU
10 EXPOSURE SECTION
11 FLASH UNIT
12 IMAGE SENSOR
14 OUTPUT DIODE
16 A/D CONVERTER
18 IMAGE BUFFER
20 CONTROL PROCESSOR

21 SHUTTER BUTTON
22 DIGITAL SIGNAL PROCESSOR
24 MEMORY CARD
24A SOLID STATE IMAGE MEMORY
24B EXTERNALLY GENERATED DATA FILES
26 SIGNAL PORT
28 ALGORITHM MEMORY
29 USER CONTROL SWITCHES
30 STATUS DISPLAY PANEL
31 MEMORY SECTION
32a FIRMWARE MEMORY
32b INSTRUCTION MEMORY
34 INTERFACE
35 NON-VOLATILE IMAGE MEMORY
36 ELECTRICALLY ERASABLE FIRMWARE MEMORY
38 INTERFACE CABLE
50 PANEL CONFIGURATION
52a "TAG" ICON
52b ALPHANUMERIC SECTION
52c BATTERY ICON
52d FLASH MODE ICON
52e SELF TIMER ICON
52f IMAGE DELETE ICON
54 TOGGLE SWITCH
56 SELECTOR SWITCH
60–66 STEPS

What is claimed is:

1. An electronic camera for capturing images representing a variety of subjects, said camera comprising:

an image sensor for capturing the images;

a converter stage for converting the images into digital image data;

a memory for storing a plurality of categories providing classification of the images by subject;

a processor having the capability of assigning the plurality of categories to the images captured by the image sensor, each category providing subject classification of one or more images;

a user control for selecting one or more categories for the images before the images are captured by the image sensor; and means for generating an output image signal comprising an image file including both the digital image data corresponding to the images and separate category data including the one or more categories selected by the user control, wherein the category data is separately accessible for each image apart from the image data.

2. An electronic camera as claimed in claim 1 wherein the memory is firmware and the categories are default categories stored in the firmware.

3. An electronic camera as claimed in claim 2 wherein the user control includes a status display for showing the default categories and the user control selects a particular one of the default categories from those displayed on the status display.

4. An electronic camera as claimed in claim 3 wherein the user controls includes a first control interface for cycling through the default categories one-by-one and displaying each category individually, and a second control interface for selecting a displayed category.

5. An electronic camera as claimed in claim 1 wherein the one or more categories included in the output image data is associated with the digital image data in a distinct file location.

6. An electronic camera as claimed in claim 1 wherein the one or more categories included in the output image data is overlaid into the image data.

7. An electronic camera as claimed in claim 1 wherein the camera further comprises a signal port for receiving externally generated categories, and wherein the processor also stores the externally generated categories in the memory and the user control is further capable of selecting a particular one of the externally generated categories.

8. An electronic camera as claimed in claim 7 wherein the externally generated categories are alphanumeric names.

9. An electronic camera as claimed in claim 7 wherein the signal port also receives externally generated text strings for one or more of the categories, and wherein the processor also stores the text strings in the memory with the one or more categories.

10. An electronic camera as claimed in claim 7 wherein the signal port also receives externally generated graphics images for one or more of the categories, and wherein the processor also stores the graphics images in the memory with the one or more categories.

11. An electronic camera as claimed in claim 9 wherein the means for generating an output image signal overlays the text strings into the digital image data.

12. An electronic camera as claimed in claim 10 wherein the means for generating an output image signal overlays the graphics images into the digital image data.

13. An electronic camera as claimed in claim 1 wherein the memory stores a plurality of default categories providing a default classification of the image by a set of codes, and wherein the camera further comprises a signal port for receiving externally generated categories, the processor stores the externally generated categories in the memory, and the user control preferentially accesses the externally generated categories when they are stored in the memory.

14. An electronic camera as claimed in claim 13 wherein the processor includes date and time information with the externally generated categories.

15. An electronic imaging system using an electronic camera as claimed in claim 7 in combination with a host processor, wherein the host processor provides the externally generated categories to the signal port.

16. An electronic imaging system as claimed in claim 15 wherein the output image signal is output to the host processor through the signal port and the host processor includes an application program which identifies images from the categories associated with the digital image data in the output image signal and downloads only the digital image data from one or more selected categories.

17. An electronic camera for capturing images representing a variety of subjects, said camera comprising:

an image sensor for capturing a particular image;

a converter stage for converting the particular image into digital image data;

a signal port for receiving at least one externally generated category providing classification of the image by subject;

a memory for storing each category provided by the signal port;

a processor having the capability of assigning said at least one category stored in the memory to the images captured by the camera, each category providing subject classification of one or more images;

a user control for selecting a particular category for the selected image; and means for generating an output image signal comprising an image file including both the digital image data corresponding to the particular image and separate category data including the particular category selected by the user control, wherein the category data is separately accessible for each image apart from the image data.

18. An electronic camera as claimed in claim 17 wherein the externally generated category is an alphanumeric name.

19. An electronic camera as claimed in claim 17 wherein the signal port also receives externally a generated text string for the particular category, and wherein the processor also stores the text string in the memory with the particular category.

20. An electronic camera as claimed in claim 17 wherein the signal port also receives an externally generated graphics image for the particular category, and wherein the processor also stores the graphics image in the memory with the particular category.

21. An electronic camera as claimed in claim 19 wherein the means for generating an output image signal overlays the text string into the digital image data.

22. An electronic camera as claimed in claim 20 wherein the means for generating an output image signal overlays the graphics image into the digital image data.

23. An electronic camera as claimed in claim 17 wherein the memory also stores a plurality of default categories providing a default classification of the image, and wherein the user control preferentially accesses the default categories when the signal port does not receive any externally generated categories.

24. An electronic imaging system using an electronic camera as claimed in claim 17 in combination with a host processor, wherein the host processor provides each externally generated category to the signal port.

25. An electronic imaging system as claimed in claim 24 wherein the output image signal is output to the host processor through the signal port and the host processor includes an application program which identifies images from the particular category associated with the digital image data in the output image signal and downloads only the digital image data from the particular category.

26. An electronic camera as claimed in claim 7 wherein the signal port connects to a removable memory card.

27. An electronic imaging system as claimed in claim 15 wherein the signal port connects to a removable memory card, and the host processor provides the externally generated categories to the signal port by writing the categories into the memory card.

28. An electronic imaging system as claimed in claim 15 wherein a cable connection is provided between the signal port and the host processor, and the host processor provides the externally generated categories over the cable connection to the signal port.

29. An electronic camera for capturing images representing a variety of subjects, said camera comprising:

an image sensor for capturing the images;

a converter stage for converting the images into digital image data;

a memory for storing a plurality of categories providing classification of the images by subject;

a processor having the capability of assigning the plurality of categories to the images captured by the image sensor, each category providing subject classification of one or more images;

a user control for selecting one or more categories for the images before the images are captured by the image sensor;

means for storing the digital image data in image files; and means for grouping the image files according to the plurality of categories.

30. A method using an electronic camera for capturing images representing a variety of subjects, said method comprising the steps of:

storing a plurality of categories providing classification of the images by subject;

assigning at least one of the plurality of categories to the images before the images are captured by the electronic camera, each category providing subject classification of one or more images;

capturing the images with the electronic camera;

converting the images into digital image data; and generating an output image signal comprising in image file including both the digital image data corresponding to the images and separate category data including the one or more categories selected by the user control, wherein the category data is separately accessible for each image apart from the image data.

* * * * *